United States Patent
Chang

(10) Patent No.: US 6,504,343 B1
(45) Date of Patent: Jan. 7, 2003

(54) CHARGING SYSTEMS FOR SIMULTANEOUSLY CHARGING NOTEBOOK COMPUTERS AND PORTABLE DEVICES

(75) Inventor: Tsung-Jen Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 10/063,202

(22) Filed: Mar. 28, 2002

(30) Foreign Application Priority Data

Nov. 8, 2001 (TW) .................................. 90127715 A

(51) Int. Cl.⁷ .............................. H02J 7/00; G06F 3/00; G05F 1/40
(52) U.S. Cl. ........................... 320/124; 323/266; 710/2
(58) Field of Search ................................ 320/124, 132, 320/134, 125; 323/265, 266, 268, 272, 282, 284, 283, 350, 351; 710/62, 2

(56) References Cited

U.S. PATENT DOCUMENTS

| | | | | |
|---|---|---|---|---|
| 5,734,254 A | * | 3/1998 | Stephens ..................... | 320/106 |
| 5,847,543 A | * | 12/1998 | Carroll ........................ | 320/125 |
| 6,087,815 A | * | 7/2000 | Pfeifer et al. ............... | 323/282 |
| 6,091,611 A | * | 7/2000 | Lanni .......................... | 363/79 |
| 6,134,612 A | * | 10/2000 | Bailey et al. ................ | 710/62 |

* cited by examiner

*Primary Examiner*—Edward H. Tso
*Assistant Examiner*—Pia Tibbits
(74) *Attorney, Agent, or Firm*—Winston Hsu

(57) ABSTRACT

A charging system for charging multiple portable devices includes transformers, branch converters and converters. Each transformer is specific to a different power supply. The branch converters and converters, specific to different portable devices, can be connected in such a way to transfer power to the various portable devices. Connections are standardized within the system giving it a modular design.

14 Claims, 5 Drawing Sheets

CHARGING SYSTEMS FOR SIMULTANEOUSLY CHARGING NOTEBOOK COMPUTERS AND PORTABLE DEVICES

BACKGROUND OF INVENTION

1. Field of the Invention

The present invention relates to a charging system, and more particularly, to a charging system that can simultaneously charge multiple portable devices.

2. Description of the Prior Art

In this modern information based society, portable devices such as mobile phones, PDAs (Personal Data Assistants), CD players, portable video players (such as Digital Versatile Disc Players), hand-held computers, and notebook computers, are very common. As portable devices are becoming smaller and lighter, users are often found carrying around two or more.

In order to for these devices to function as portable, they require batteries, and typically, these batteries are rechargeable. Please refer to FIG. 1. FIG. 1 is a perspective view showing a system by which portable devices are charged according to the prior art. The portable device 10A has a charging port 12A for receiving an operating voltage carried by direct current. Two kinds of transformers, used to charge the portable device 10A, are shown. Transformer 16A has an input port 17A for receiving an alternating current 20 from a wall outlet. The transformer 16A transforms the alternating current 20 into the operating voltage of the portable device 10A and then outputs the operating voltage from an output port 14A. Similarly, an input port 19A of the transformer 18A can receive a direct current 21 from a source such as a standard automobile power point. The transformer 18A transforms the direct current into the operating voltage of the portable device 10A and then outputs the operating voltage from an output port 15A. Users can select either transformer 16A or 18A depending on the desired application. The output port of he transformer is connected to the charging port 12A of the portable device 10A and the portable device 10A becomes charged.

Portable devices have various charging port connection standards and operating voltages. Common operating voltages are 3 and 12 volts and many devices have unique charging ports. Therefore, prior art devices require specific and often unique charging assemblies. As shown in FIG. 1 each of the three portable devices (10A, 10B, and 10C) requires two charging assemblies each with a different transformer and connection. A user wanting to fully use the portability of these devices would have to carry around a total of six chargers (16A, 18A, 16B, 18B, 16C, and 18C).

As portable devices become increasingly popular, there are an ever-increasing number of places in which they can be charged. For example, automobiles provide direct current through a power point or cigarette lighter and some passenger planes provide charging sockets so that passengers can charge their portable devices while traveling. However, the prior art requires that users carry around exclusive transformers for each of the various portable devices. Not only is this an inconvenience to the user, having device specific chargers increases the costs of design and manufacture. Additionally, many of the places where a user can charge their portable devices only provide a single charging port. If a passenger of a car or airplane has more than one device that they wish to charge they must manually swap them a further inconvenience.

SUMMARY OF INVENTION

It is therefore a primary objective of the claimed invention to provide a charging system for portable devices that has a detachable modular design and utilizes a single power source to charge multiple portable devices requiring different operating voltages and having different connection standards.

The claimed invention, briefly summarized, discloses a charging system for charging a plurality of portable devices. Each portable device comprises a charging port for receiving a corresponding operating voltage of the portable device. The charging system comprises a plurality of transformers, at least a branch converter, and a plurality of converters. Each transformer is used to transform an input voltage into a standard voltage and output direct current from an output port. Each branch converter comprises an input port, a power conversion circuit, a transmission port, and an output port. The input port is used to receive the standard voltage outputted from the output port of the transformer. The power conversion circuit is used to transform the standard voltage into a transmission voltage and the corresponding operating voltage of the portable device. Each of the transmission voltage and the operating voltage are carried by direct current. The transmission port is used to output the transmission voltage. The output port corresponding to the charging port of the portable device is used to output the operating voltage of the portable device. The plurality of converters is used to transform the transmission voltage into a plurality of operating voltages required by the portable devices. Each converter comprises an input port corresponding to the transmission port of the branch converter for receiving the transmission voltage and an output port corresponding to the charging port of the portable device for outputting the operating voltage. When two portable devices need to be charged simultaneously, users connect the branch converter belonging to one of the portable devices to the transformer, and connect the converter belonging to another portable device to the branch converter.

It is an advantage that the claimed invention can charge many portable devices at once by using a single transformer and power supply. The claimed invention also has a modular design that can decrease production costs and makes it convenient and portable to the user.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
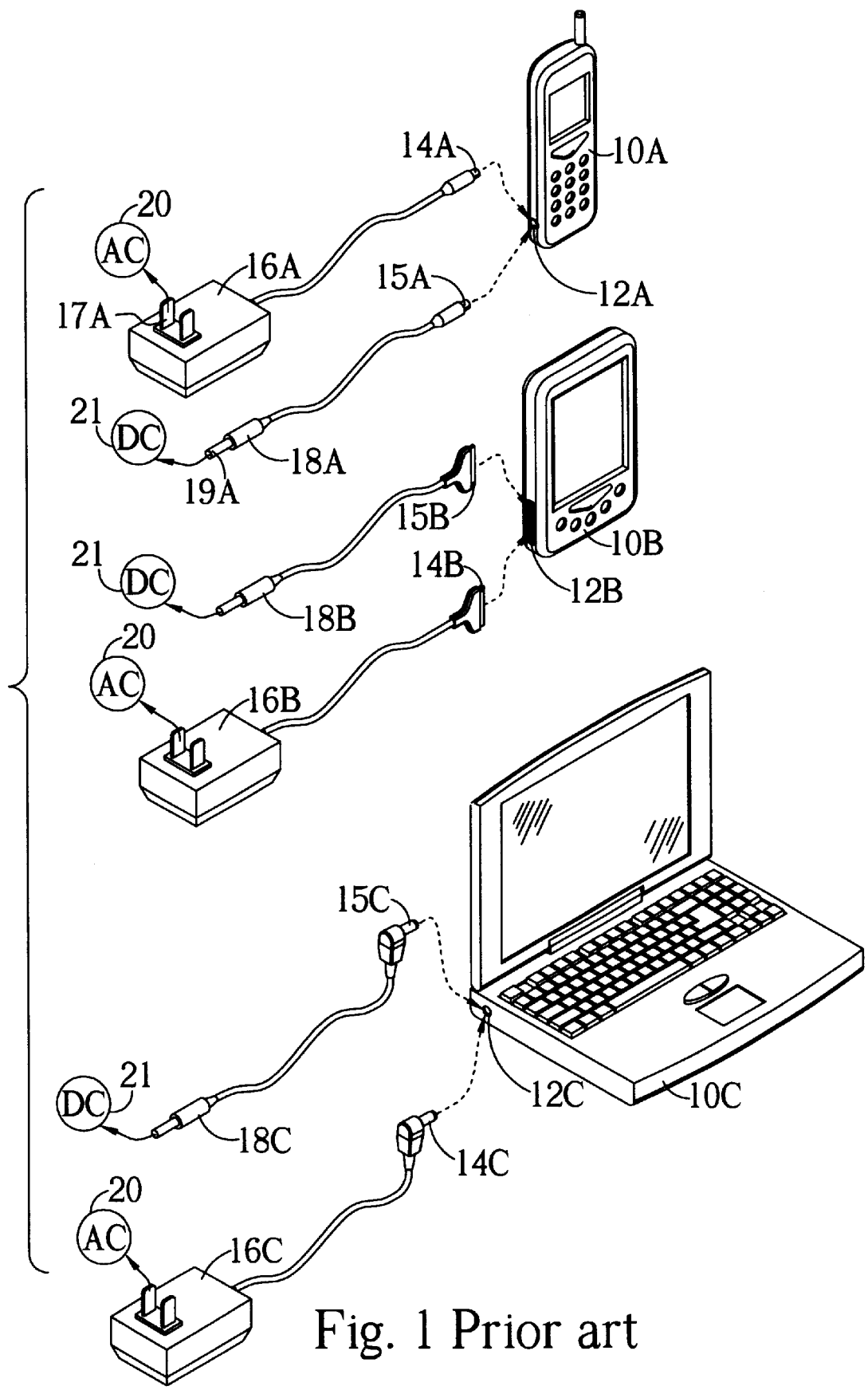
FIG. 1 is a perspective view in which portable devices are charged according to the prior art.
Figure 2:
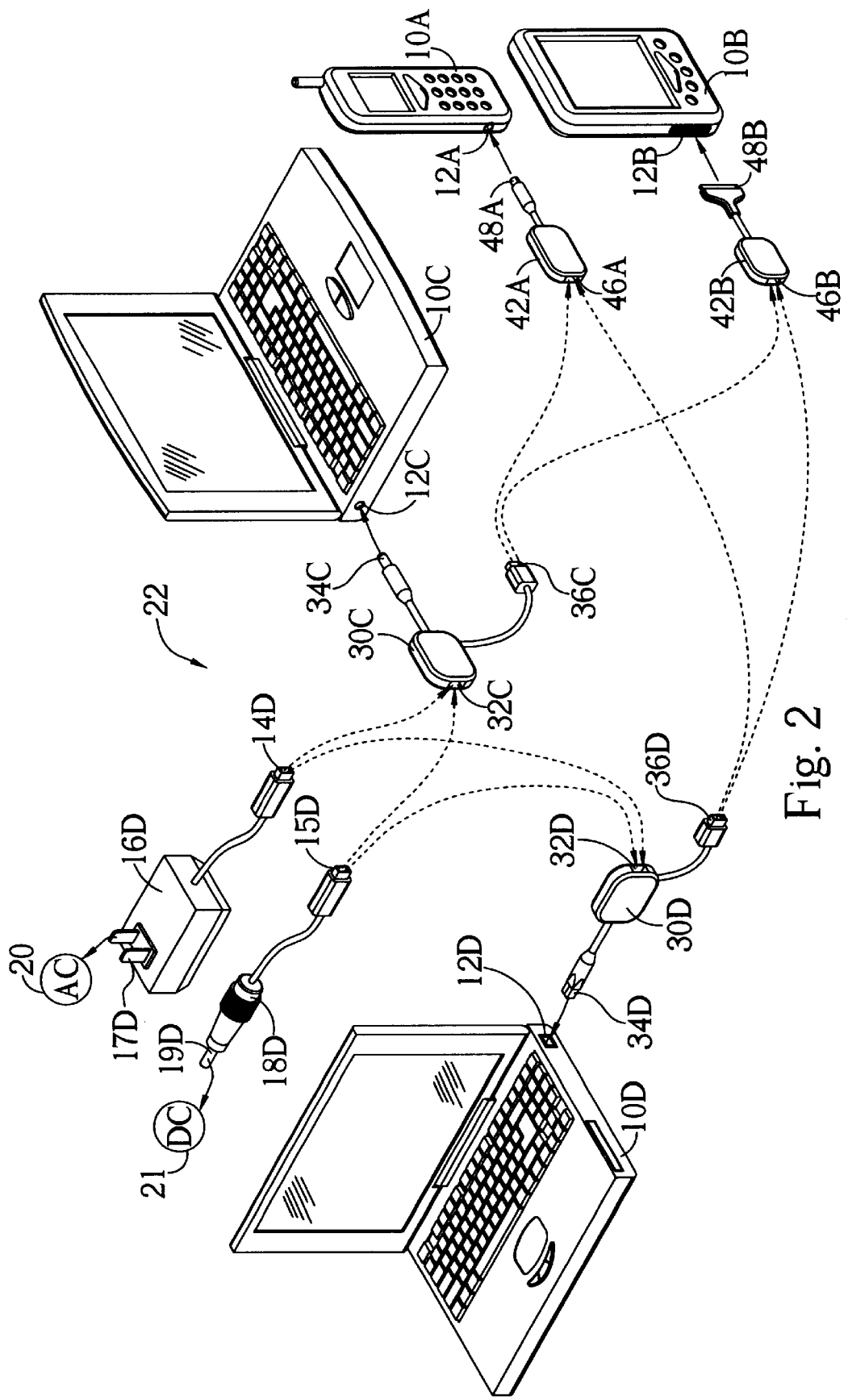
FIG. 2 is a perspective view of an embodiment of a present invention charging system.

Please refer to FIG. 2. FIG. 2 is a perspective view of an embodiment of a present invention charging system 22. The present invention charging system can charge a plurality of portable devices. The embodiment shown in FIG. 2 uses four portable devices as an example. This, of course is not limiting. The present invention charging system can be widely used with various different portable devices. The portable devices 10A, 108, 10C and 10D shown in FIG. 2 can be mobile phones, personal digital assistants, or notebook computers, among others. As mentioned above, each portable device 10A to 10D respectively has an exclusive charging port 12A to 12D. Each portable device must be supplied a specific operating voltage to charge safely and correctly.

The present invention charging system comprises a plurality of transformers, and of branch converters and converters corresponding to different portable devices. Each transformer corresponds to one kind of power source for transforming the power into a standard voltage carried by a direct current. As shown in FIG. 2, a transformer 16D is designed for use with an alternating current power source 20 such as power provided by a wall socket. The transformer 16D receives power from the alternating current power source 20 through an input port 17D and transforms it into a standard voltage carried by direct current. The transformer 16D outputs the standard voltage from an output port 14D. Likewise, the transformer 18D receives power from a direct current power source 21, such as provided by a charging socket in an automobile or airplane, from an input port 19D. The transformer 18D transforms the power into a standard voltage carried by direct current, and then outputs the standard voltage from an output port 15D. In the present invention, the physical connections of the output ports of each transformer are identical, and the output power has the same standard voltage.

The branch converters receive the standard voltage from a transformer and convert it to an operating voltage corresponding to a portable device, and a transmission voltage. Each branch converter has an output port and a transmission port. The output port is used to output the operating voltage corresponding to the portable device. The transmission port is used to output a transmission voltage carried by direct current. Branch converter 30C, shown in FIG. 2, is designed for portable device 10C. The input port 32C of the branch converter 30C can connect with the output port of each of the transformers 16D and 18D to receive the standard voltage. After receiving the standard voltage, the branch converter 30C converts the standard voltage into the operating voltage of the portable device 10C and the transmission voltage. The operating voltage of the portable device 10C is outputted from the output port 34C, and the transmission voltage is outputted from the transmission port 36C. The physical connection of the output port 34C matches that of the charging port 12C of the portable device 10C. The power outputted from the output port 34C is that required by the portable device 10C. Similarly, the branch converter 30D is designed for the portable device 10D. After receiving the standard voltage at the input port 32D, the branch converter 30D outputs the operating voltage of the portable device 10D through an output port 34D. The physical connection of the output port 34D matches that of a charging port 12D of the portable device 10D. The branch converter 30D further converts the standard voltage into the transmission voltage. The transmission voltage is outputted from a transmission port 36D of the branch converter 30D. In the present invention, the shape of the output port of each branch converter corresponds to a portable device (such as a notebook computer as illustrated). The branch converter transmission ports, however, have identical physical connections and transmission voltages.

Each of the plurality of converters of the present invention corresponds to a portable device. Each converter can accept the transmission voltage via an input port. The converter converts the transmission voltage into the operating voltage corresponding to a portable device, and then outputs the operating voltage through an output port. The output port of each converter can connect with the charging port of the corresponding portable device. The converter 42A, shown in FIG. 2, can connect with the portable device 10A. The converter 42A converts the transmission voltage received at the input port 46A into the operating voltage of the portable device 10A, and then outputs the operating voltage through the output port 48A. The physical connection of the output port 48A matches that of the charging port 12A of the portable device 10A. Similarly, the converter 42B is designed for the portable device 10B and converts the transmission voltage received at the input port 46B into the operating voltage of the portable device 10B, and outputs the operating voltage from the output port 48B. The physical connection of the output port 48B matches that of the charging port 12B. The connection of the input port of each converter mates with the transmission port of each branch converter. The input port of each converter can accept the transmission voltage outputted from the transmission port of each branch converter.

In the present invention, although each transformer is designed for different power sources, it is standardized in output port connection and power supplied. Each branch converter is designed for a different portable device. Although the output port of each branch converter is specific to a corresponding portable device, the input port of the branch converter can connect with the output port of each of the transformers. The connection and power output of the transmission port of each branch converter are also the same. Each converter is designed for a different portable device. The input ports of the converters are the same, in connection and power, and match the transmission port of the branch converters.

The operation of the present invention is illustrated as follows. For example, users want to use the direct current power source 21 to charge the portable device 10C. Users can do that by first connecting the output port 15D of the transformer 18D to the input port 32C of the branch converter 30C, then connecting the output port 34C of the branch converter 30C to the corresponding charging port 12C. The transformer 18D transforms the power supplied by the direct current power source 21 into the standard voltage, also carried by direct current. The branch converter 30C converts the standard voltage into the operating voltage of the portable device 10C. The converted operating voltage is transmitted into the portable device, which becomes charged. If users now want to charge the portable device 10B at the same time, users can do that by first connecting the transmission port 36C of the branch converter 30C to the input port 46B of the converter 42B, then connecting the output port 48B of the converter 42B to the charging port 12B of the portable device 10B. The branch converter 30C not only converts the standard voltage into the operating voltage to charge the portable device 10C, but also convert the standard voltage into the transmission voltage and transmits the transmission voltage to the converter 42B through the transmission port 36C. The converter 42B converts the transmission voltage into the operating voltage of the portable device 10B. The converted operating voltage is transmitted to the portable device 10B through the output port 48B and the charging port 12B so that the portable device 10B becomes charged.

One of the features of the present invention is that the output port of both transformers and the input port of each of the branch converters share the same connection standard. The transmission port of each branch converter and the input port of each converter also share a common connection standard. This allows many portable devices to be charged by the same transformer, although each portable device has a different operating voltage. Users can use various power sources to charge their portable devices and each portable device only needs one corresponding converter or branch converter. Therefore, each portable device need not have an exclusive transformer, as was the case of the prior art.

Additionally, the present invention can simultaneously charge two portable devices. For example, users can simultaneously charge the portable device 10B while charging the portable device 10C. To do this users only need to connect transmission port 36C of the branch converter 30C to the converter 42B so that the portable device 10B can be charged through output port 48B and charging port 12B. If users want to charge the portable device 10A instead of the portable device 10B, users need not change the branch converter 30C but only disconnect the converter 42B and connect the converter 42A.

Figure 3:
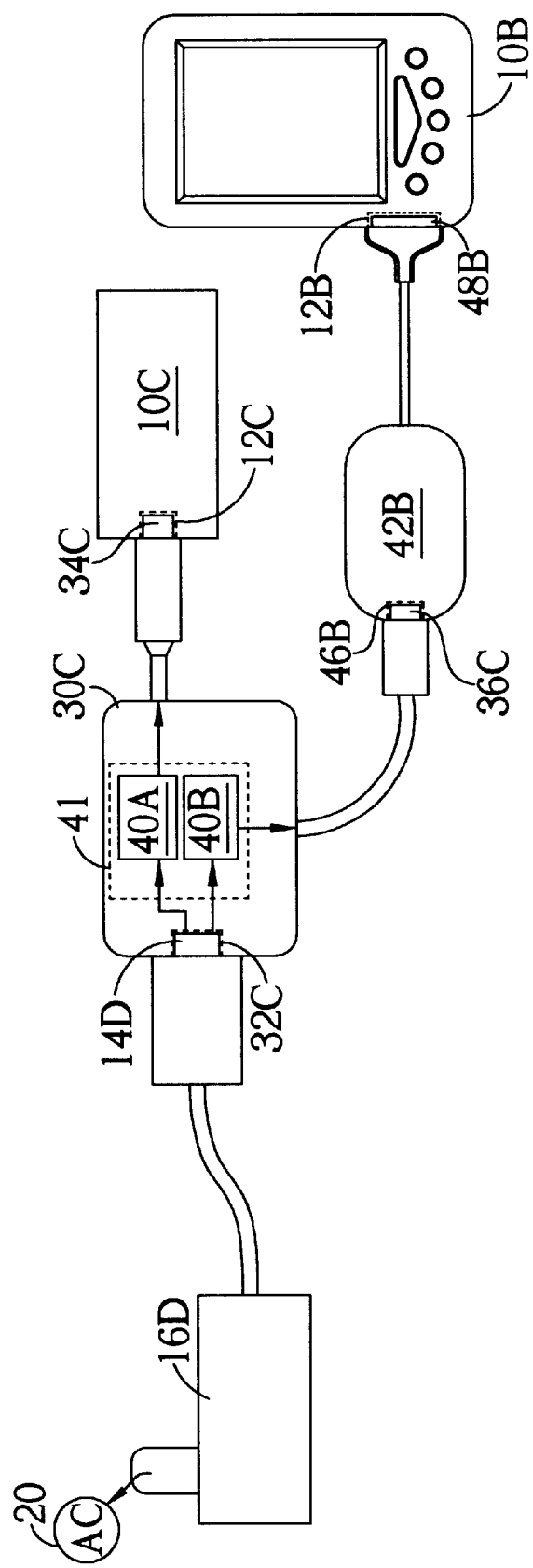
FIG. 3 is a functional block diagram in which a branch converter shown in FIG. 2 uses an alternating current power source to simultaneously charge two portable devices.

Please refer to FIG. 3. FIG. 3 is a functional block diagram in which the branch convert 30C shown in FIG. 2 uses the alternating current power source 20 to simultaneously charge the portable devices 10C and 108. In this embodiment, the branch converter 30C has a power conversion circuit 41 for transforming the electrical power. The power conversion circuit 41 comprises a first transformation circuit 40A and a second transformation circuit 40B. The first transformation circuit 40A is connected between the input port 32C and the output port 34C of the branch converter 30C, transforms the standard voltage into the operating voltage of the portable device 10C, and outputs the operating voltage through the output port 34C. The second transformation circuit 40B is connected between the input port 32C and the transmission port 36C, transforms the standard voltage into the transmission voltage, and outputs the transmission voltage through the transmission port 36C. The first transformation circuit 40A and the second transformation circuit 40B can be accomplished with DC-to-DC conversion choppers.

Figure 4:
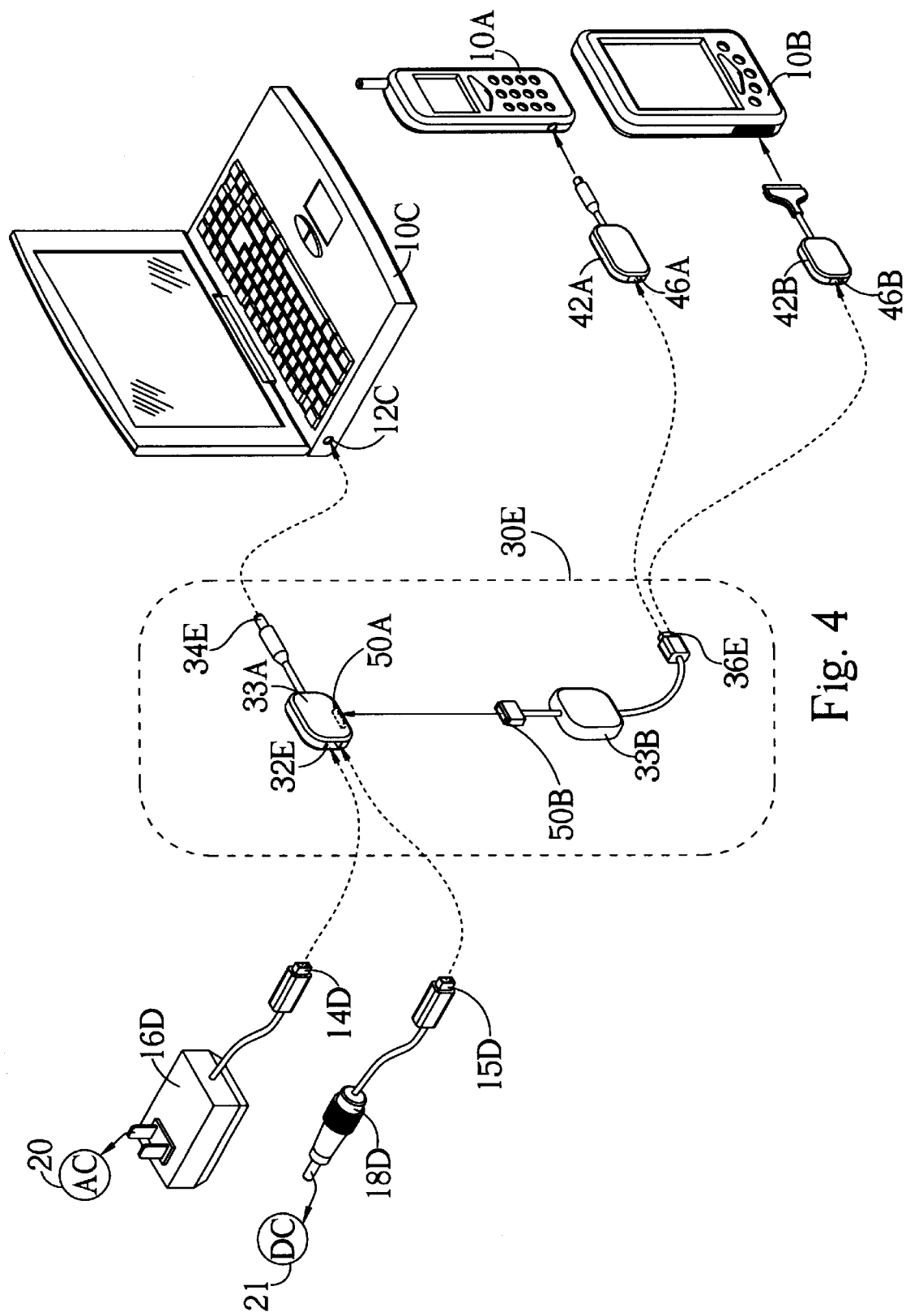
FIG. 4 is a perspective view of a second embodiment of the present invention charging system.

Please refer to FIG. 4. FIG. 4 is a perspective view of a second embodiment of the present invention charging system. The branch converter 30E of this second embodiment is constructed differently from the branch converters 30C and 32D shown in FIG. 2, but the function remains identical. The branch converter 30E comprises a first portion 33A and a second portion 33B. The first portion 33A and the second portion 33B have power ports 50A and 50B respectively and are detachably connected by these power ports. The branch converter 30E converts the standard voltage into the operating voltage of the portable devices and transmits the operating voltage as the transmission voltage. The input port 32E of the branch converter 30E is installed on the first portion 33A. The input port 32E has a connection that fits that of the output port of the transformers and accepts the standard voltage. The output port 34E is installed on the first portion 33A of the branch converter 30E for outputting the operating voltage corresponding to the portable device 10C. In embodiment shown in FIG. 4, the output port 34E connects with the charging port 12C of the portable device 10C. The transmission port 36E of the branch converter 30E is installed on the second portion 33B for transmitting the transmission voltage. The standard of the transmission port 36E is the same as the standard of the transmission ports 36C and 36D of the branch converters 30C and 30D shown in FIG. 2. The transmission port 36E can connect with the input port of the present invention converters and can provide the transmission voltage to the converters.

Figure 5:
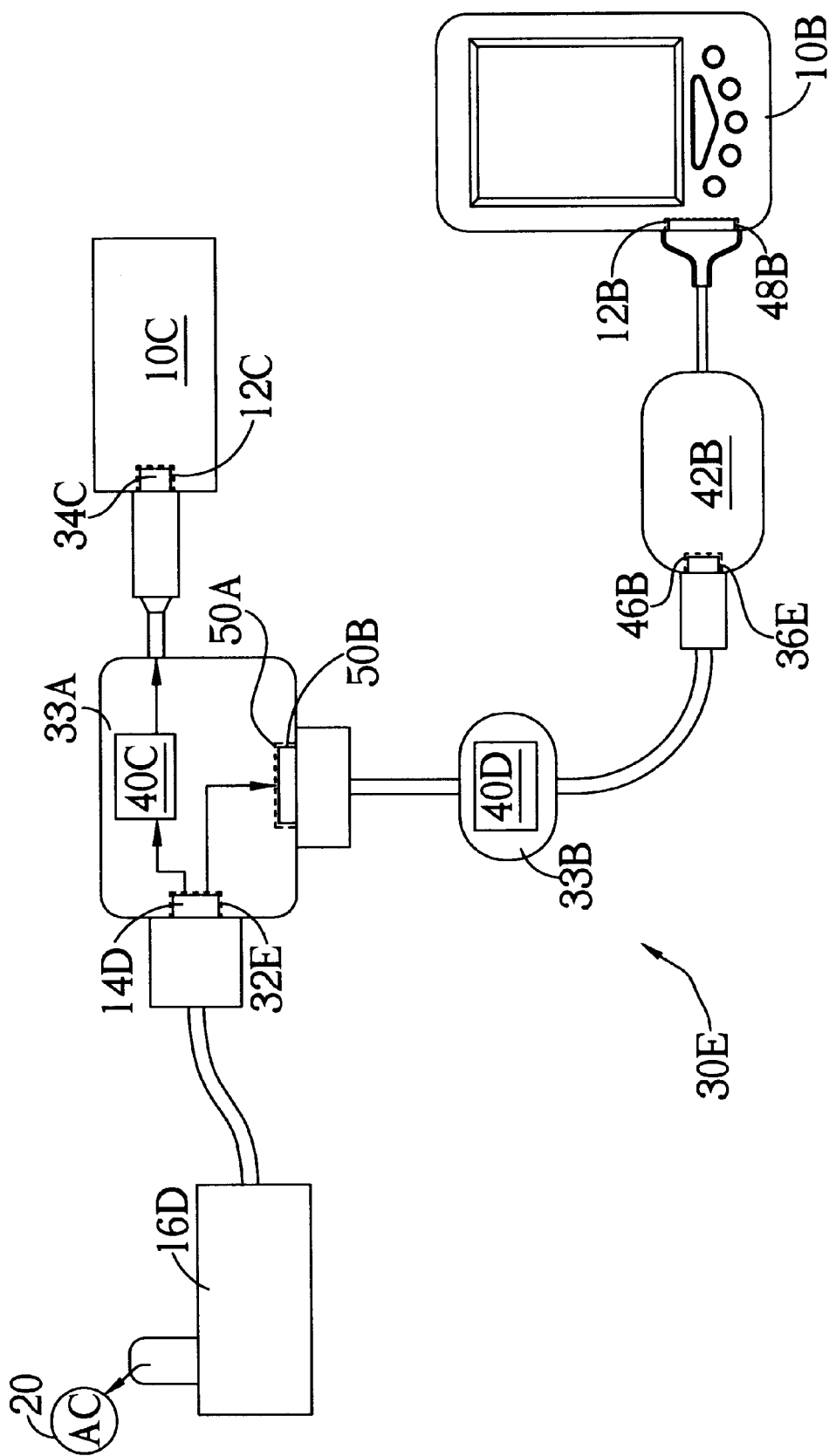
FIG. 5 is a functional block diagram of the second embodiment of the present invention charging system.

Please refer to FIG. 5. FIG. 5 is a functional block diagram of the second embodiment of the present invention charging system. The branch converter 30E can output power from the output port 34C and the transmission port 36E to charge the two portable devices 10C and 10B. The key difference between the branch converter 30E and the branch converter 30C is where the transformation circuits are installed. The first transformation circuit 40C, which transforms the standard voltage into the operating voltage of the portable device 10C, is installed inside the first portion 33A of the branch converter 30E, while the second transformation circuit 40D, which transforms the standard voltage into the transmission voltage, is installed inside the second portion 33B. The standard voltage received by the input port 32E of the branch converter 30E is routed to the second transformation circuit 40D through the detachable connection of the power ports 50A and 50B. The second transformation circuit 40D transforms the standard voltage into the transmission voltage and outputs the transmission voltage to the converter through the transmission port 36E. The first transformation circuit 40C is be designed for different portable vices. As the transformation circuits 40C and 40D are physically separated, a further cost savings can be realized by the fact that the second portion 33B is independent of the portable device charged.

In conclusion, the modular design and standardized power transformation of the present invention allow users to simultaneously charge two or more portable devices conveniently. In the prior art, each portable device requires an exclusive transformer for different power sources. In contrast, the present invention only has one transformer for each power source to charge multiple portable devices, which is more efficient. The modular design of the present invention reduces its production cost and makes it conveniently portable.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A charging system for charging a plurality of portable devices, each portable device comprising a charging port for receiving a corresponding operating voltage of the portable device, the charging system comprising:

a plurality of transformers for transforming a plurality of input voltages into a standard voltage, each transformer comprising an output port for outputting the standard voltage carried by direct current;

at least a branch converter, each branch converter comprising:

an input port for receiving the standard voltage outputted from the output port of the transformer;

a power conversion circuit for transforming the standard voltage into a transmission voltage and the corresponding operating voltage of the portable device, each of the transmission voltage and the operating voltage being carried by direct current, a transmission port for outputting the transmission voltage; and an output port, which corresponds to the charging port of the portable device, for outputting the operating voltage of the portable device; and a plurality of converters for transforming the transmission voltage into a plurality of operating voltages according to the portable devices, each converter comprising an input port corresponding to the transmission port of the branch converter for receiving the transmission voltage and an output port corresponding to the charging port of the portable device for outputting the operating voltage of the portable device;

wherein when two portable devices need to be charged, a user connects the branch converter belonging to one of the portable devices to the transformer, and connects the input port of the converter belonging to another portable device to the branch converter, so that the two portable devices are both charged by the input voltage of the transformer at the same time.

2. The charging system of claim 1 wherein the transformer is used for transforming the input voltage carried by alternating current into the standard voltage carried by direct current.

3. The charging system of claim 1 wherein the transformer is used for transforming the input voltage supplied by a car or an airplane into the standard voltage, and the input voltage is carried by direct current.

4. The charging system of claim 1 wherein the portable device connected to the output port of the branch converter is a notebook computer.

5. The charging system of claim 1 wherein the portable device connected to the output port of the converter is a mobile phone.

6. The charging system of claim 1 wherein the portable device connected to the output port of the converter is a personal digital assistant (PDA).

7. The charging system of claim 1 wherein the power conversion circuit of each branch converter comprises a first transformation circuit connected between the input port and the output port of the branch converter for transforming the standard voltage into the operating voltage and a second transformation circuit connected between the input port and the transmission port of the branch converter for transforming the standard voltage into the transmission voltage.

8. The charging system of claim 7 wherein each second conversion circuit comprises a power port for making the second conversion circuit be separably connected to the input port of the branch converter.

9. A charging system for charging at least a portable device and a notebook computer, each of the portable device and the notebook computer comprising a charging port for receiving a corresponding operating voltage, the charging system comprising:

a plurality of transformers for transforming a plurality of input voltages into a standard voltage, each transformer comprising an output port for outputting the standard voltage carried by direct current;

a branch converter comprising: an input port for receiving the standard voltage outputted from the output port of the transformer;

a power conversion circuit for transforming the standard voltage into a transmission voltage and the corresponding operating voltage of the notebook computer, the transmission voltage and the operating voltage of the notebook computer being carried by direct current, a transmission port for outputting the transmission voltage; and an output port, which corresponds to the charging port of the notebook computer, for outputting the operating voltage of the notebook computer; and a plurality of converters for transforming the transmission voltage into a corresponding operating voltages of the portable devices, each converter comprising an input port corresponding to the transmission port of the branch converter for receiving the transmission voltage and an output port corresponding to the charging port of the portable device for outputting the operating voltage of the portable device;

wherein a user connects the branch converter to the transformer, connects the output port of the branch converter to the charging port of the notebook computer, and connects the input port of the converter belonging to portable device to the output port of the branch converter, so that the notebook computer and the portable device are both charged by the input voltage of the transformer at the same time.

10. The charging system of claim 9 wherein the transformer is used for transforming the input voltage carried by alternating current into the standard voltage carried by direct current.

11. The charging system of claim 9 wherein the transformer is used for transforming the input voltage supplied by a car or an airplane into the standard voltage, and the input voltage is carried by direct current.

12. The charging system of claim 9 wherein the portable device connected to the output port of the converter is a mobile phone.

13. The charging system of claim 9 wherein the portable device connected to the output port of the converter is a personal digital assistant (PDA).

14. The charging system of claim 9 wherein the power conversion circuit of the branch converter comprises a first transformation circuit connected between the input port and the output port of the branch converter for transforming the standard voltage into the operating voltage and a second transformation circuit connected between the input port and the transmission port of the branch converter for transforming the standard voltage into the transmission voltage.

* * * * *